Feb. 27, 1934.     C. H. HAVILL     1,949,203
DRIVING MECHANISM
Filed Oct. 28, 1932     2 Sheets-Sheet 1
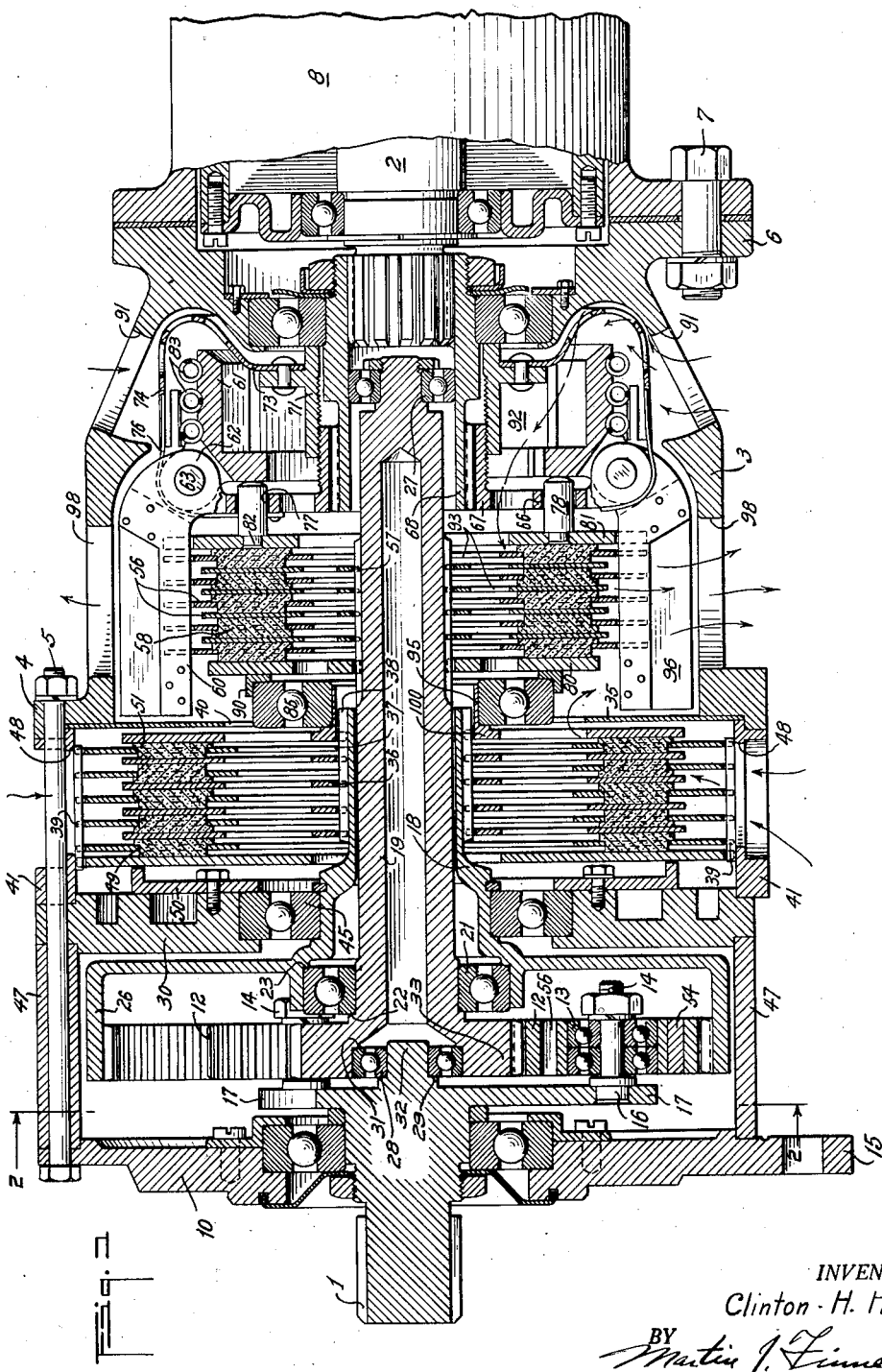
INVENTOR.
Clinton H. Havill
BY
ATTORNEY.

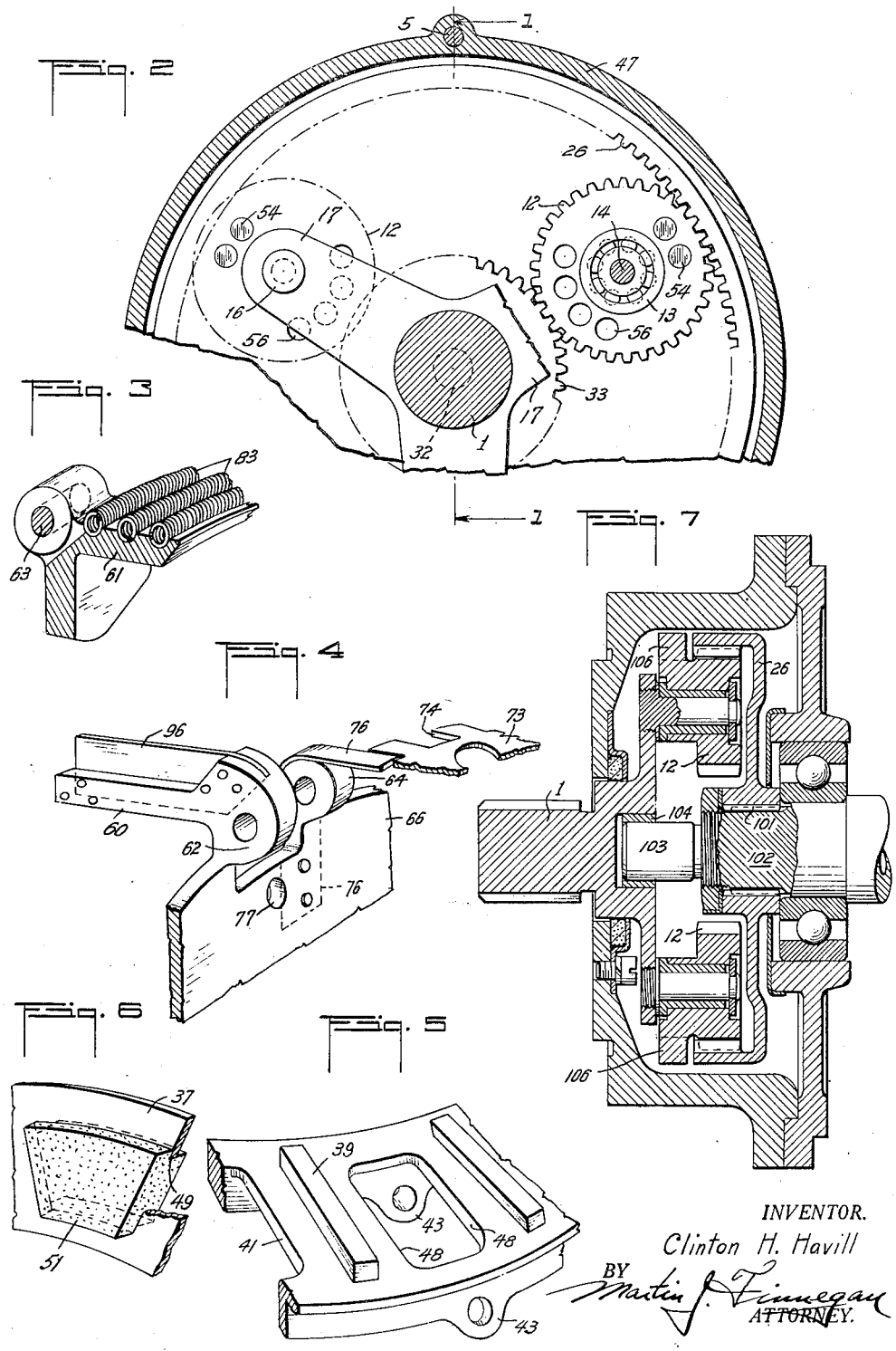

Patented Feb. 27, 1934

1,949,203

UNITED STATES PATENT OFFICE 1,949,203

DRIVING MECHANISM

Clinton H. Havill, South Orange, N. J., assignor, by mesne assignments, to Eclipse Aviation Corporation, East Orange, N. J., a corporation of New Jersey Application October 28, 1932. Serial No. 640,085

10 Claims. (Cl. 74—34)

This invention relates to driving mechanisms and more particularly to devices in which relative rotation is possible between the driving and driven members thereof.

An object of the invention is to provide in a driving mechanism of the foregoing character, novel means operable in response to changes in speed for controlling the speed of the driven member.

A further object is to provide a driving mechanism in which the driving and driven shafts, although normally rotatable at different speeds, are nevertheless capable of rotation at the same speed.

A further object is to provide in a driving mechanism embodying driving and driven shafts connected by an intermediate shaft, a novel mechanism operative in response to changes in speed of the driving shaft for controlling the speed of both the intermediate and driven shafts, in combination with additional means operative in response to changes in the speed of the driven shaft to directly control the driving ratio between the intermediate and driven shafts, and indirectly control the ratio between said driving and intermediate shafts.

Another object is to provide a driving mechanism involving driving and driven shafts operating at a one-to-one driving ratio above a critical speed, the ratio below said speed being variable in accordance with the square of the speed of the driving shaft. In this connection a feature of the invention is the provision of a novel planetary gear train including a plurality of driving wheels dynamically unbalanced with respect to their individual axes of rotation, but all adapted to rotate on a common driven wheel constituting a circular track at speed below a predetermined critical value, the assembly of driving and driven elements being locked for rotation as a single integral unit whenever the speed exceeds said predetermined critical value.

A further object of the invention involves the provision of retarding means, preferably in the form of a friction brake, for opposing the tendency of the driven wheel or track to rotate with the driving wheels.

Another object is to provide a driving mechanism of novel construction in which the component parts are compactly and symmetrically positioned and readily accessible for inspection or repair.

Other objects and advantages to be derived from the use of the invention herein disclosed reside in the inter-relation and method of operation of the parts, and will become apparent upon inspection of the following specification when read with reference to the accompanying drawings wherein the preferred embodiments of the invention are illustrated. It is to be expressly understood, however, that the drawings are for the purpose of illustration only, and are not to be construed as a definition of the limits of the invention, reference being had for this purpose to the appended claims.

In the drawings,

Fig. 1 is a central longitudinal section through a device embodying the invention;

Fig. 2 is a fragmental transverse sectional view taken along the line 2—2 of Fig. 1;

Figs. 3, 4, 5 and 6 are fragmental views in perspective of certain details; and

Fig. 7 is a central longitudinal section through a modified arrangement of the planetary members.

Referring to the drawings, and particularly to Fig. 1, the invention is illustrated as embodied in a driving mechanism comprising a driving member 1, a driven shaft 2, and a plurality of intermediate members of novel construction drivably connecting the members 1 and 2 and enclosed within a casing 3 having a flange 4 provided with openings through which suitable fastening means 5 may be inserted for attachment to an end plate 10 which in turn is flanged, as at 15, for attachment to a suitable support, such as the frame of the prime mover. At the opposite end the casing 3 is preferably provided with a second flange 6 through which pass bolts 7 securing the housing 8 of a generator or other device to be driven.

As above suggested, the invention contemplates the provision of novel means for drivably connecting the shafts 1 and 2 to permit relative rotation of the two shafts; such driving connections preferably take the form of a plurality of driving wheels 12 of equal diameter, and each including a bearing 13 mounted on a stud 14. As shown, these studs are provided at equal angular intervals about the axis of rotation of the driving shaft 1, the said studs being secured as indicated at 16 to the correspondingly positioned arms 17 (Figs. 1 and 2) of a yoke or cage preferably integral with the driving shaft 1. The driving wheels are shown in the form of pinions meshing with teeth provided on the inner surface of the annular rim of a driven wheel having a centrally disposed elongated hub 18 surrounding an intermediate shaft 19, and separated therefrom by a ball bearing assembly 21 held in position by the opposing shoulders 22 and 23 formed on shaft 19 and the hub 18 respectively of the driven wheel 26. The intermediate shaft 19 is rotatably supported at its opposite end by a ball bearing assembly 27 while at its opposite end another ball bearing assembly 28 is held in position by the shoulders 29 and 31 formed on the inner extension 32 of the driving shaft 1, and the flanged end 33 of the intermediate shaft 19, said flanged end having its circumference formed with gear teeth adapted to mesh with the driving pinions 12 and thus constituting a sun gear about which said pinions revolve. Hub 18 of wheel 26 is supported on transverse plate 30 by a suitable bearing assembly 45. As shown plate 30 carries a bearing retainer plate 50 which also serves as an abutment for the friction brake, now to be described.

Means are provided for resisting movement of the driven wheel 26, and in the form shown such means includes a friction brake formed by a set of interleaving metal discs 36 and 37, the former being splined to the splines or slots 38 provided on the hub 18 of the driven wheel 26, and the latter being similarly splined, as indicated at 39 and as better illustrated in Fig. 5, to an annular member 41 fixed in position between the transverse supporting wall of the housing and the flanged end 4 of the main housing section 3. As indicated best in Fig. 5, this annular member 41 is provided with apertured ears 43 through which bolts 5 pass to secure the housing section 47 in position, and is further apertured as indicated at 48, between the successive splines to permit free circulation of air along and between adjacent metallic discs 36 and 37, the flow of air being directed by a deflector 35, apertured at 40 for a purpose to be further explained hereinafter. It will be further noted that the discs 37 are provided with angularly spaced openings 49 as shown best in Fig. 6, in which openings are inserted the segmental friction blocks 51 constructed of suitable gripping material, such as carbon, the discs 36 with which the blocks 51 are in contact being preferably of metal to permit their being splined to the hub 18.

As explained more fully hereinafter, means are provided for varying the pressure on the friction plates and carbon blocks so as to change the critical point at which the driven wheel will overcome this frictional resistance and rotate with the driving wheels 12; but in the form shown, this critical point is initially determined by the number and mass of the weights 54 (Fig. 2) provided in each driving wheel at points diametrically opposed to the circular cutouts 56 of said wheels. These weighted parts 54 of the driving wheels are composed of materials of greater weight than the wheels themselves, constitute in conjunction with the arrangement of elements above described, one of the novel features of the invention, and operate to exert a constant tendency to lock the driving pinions with the teeth of the driven wheel and thus effect a one-to-one driving ratio as between the driving shaft and the intermediate shaft 19. This locking tendency is due to the action of centrifugal force which increases with the square of the speed of the driving shaft and constantly tends to maintain the driving wheels 12 and driven wheel 33 in the relative positions indicated in Fig. 2 as against the tendency of wheels 12 to rotate about their individual axes and along the teeth of the wheel 26 as a track, absorbing the reaction through the friction brake 36, 37. To the extent that the wheels rotate about their individual axes and around the wheel 26 as a circular track, rotation is imparted to the sun gear 33 and intermediate shaft 19 integral therewith, so as to drive the latter at a speed greater than the speed of the driving shaft in the proportion which the diameter of the driving wheels, and their distance from the central axis, bears to that of the sun gear. As the speed increases, however, the locking tendency likewise increases until it becomes sufficiently strong to rotate the driven wheel 26, and discs 36 splined thereto, relatively to the stationary discs 37 thus overcoming the friction of the blocks 51 and effecting a one-to-one drive between the driving shaft 1 and the intermediate shaft 19.

As above suggested, the invention further contemplates the provision of means acting in conjunction with the ratio changing means above described to permit relative rotation between the intermediate shaft 19 and the driven shaft 2 to such an extent as to tend to maintain the latter shaft in operation at a substantially constant speed. Such driving connections preferably include a second set of discs 56, some of which are splined to the intermediate shaft 19 as indicated at 57, and the others of which are provided with carbon blocks similar to those indicated at 51, the latter discs being splined to fingers 60, as indicated in Figs. 1 and 4. As shown, these fingers 60 have apertured ears 62 for reception of pins 63 providing a pivotal mounting for weights 61 in corresponding ears 64 provided at equal intervals about the circumference of a plate 66, the latter having a hub 67 the interior surface of which is splined to a sleeve 68 which is in turn splined to shaft 2 to be movable axially thereof and to rotate in unison therewith. The discs 56 are normally held in the position to which they are adjusted by the provision of an adjusting nut 71 surrounding sleeve 68 and threadedly engaging the hub 67, and at its opposite end receiving a cage 73 the outer rim of which is slotted as indicated at 74 (Figs. 1 and 4) to receive a retainer strip 76 extending from plate 66. The plate 66 is further provided with openings 77 in line with the weights 61 to permit the passage therethrough of studs 78, the ends of which are embedded in a pressure plate 81 as indicated at 82. At the opposite end of the clutch pack there is a similar pressure plate or abutment 80, spaced from the outer race of thrust transmitting bearing 85 by a suitable flanged annular ring 90, the inner race of the bearing 85 being supported on the hub 95 of the pressure plate 100 of the first clutch pack 36, 37.

Surrounding the assembly of weights 61, a plurality of coiled springs 83 engage the outer arcuate surface thereof and exert thereupon an inwardly directed pressure which yieldably holds the weights in the position shown in Fig. 1, in which position the lateral faces thereof contact the ends of the studs 78 and thus hold the plate 81 against movement out of position of maximum axial pressure upon the clutch members 56, thus insuring a virtually positive driving connection between the shaft 19 and the sleeve 68, so long as the former rotates within a predetermined speed. In the event, however, of an increase in speed above such predetermined value, the resultant increase in centrifugal force tending to move the weights 61 outward, overcomes the oppositely directed force of the springs 83 and produces an oscillatory movement of the weights about their pivotal supports 63 and a consequent relaxation of the force resisting expansion of the clutch plates out of frictional engagement. Such action permits the friction blocks 58 to slip along the contiguous disc surfaces and also causes a relaxation of the pressure on the brake discs 36, 37 which in turn decreases the resistance exerted upon the driven wheel 26 against the locking tendency of the driving pinions 12. The result is a change in the critical point at which the pinions 12 establish a one-to-one driving ratio, as between the shafts 1 and 19. A further result is that the sleeve 68 now lags behind the shaft 19 in its rotary movement and thus reduces the centrifugal force acting on the weights until such force is brought back to the value at which it is completely balanced by the oppositely directed force of the springs 83, whereupon the condition of virtual positive drive between the shafts 19 and 2 is again established. It will be noted that the radially flanged portion of member 73 serves to prevent an excess expansive condition of springs 83 due to centrifugal action of the weights 61.

The cycle of events just described will of course be repeated on every occasion when the rotating parts depart from the predetermined normal speed. Hence it is apparent that on every such tendency the control means above described will come into action to nullify such tendency and thereby maintain the driven shaft 2 at a substantially constant speed.

Means may be provided for ventilating the assembly and for removing the heat generated by the friction of the parts, particularly the surfaces of the friction members. As shown best in Fig. 1, such means comprises a plurality of openings 91 in the casing 3 in positions adjacent the springs 83 permitting the entry of cooling air which is free to pass through the openings 91 in the casing and into the relatively large annular space 92 from which space it enters the openings 93 in discs 56. Here, there is imparted thereto a rather high velocity causing a turbulent action thereof as the air sweeps along and between the successive friction blocks, and an impelling effect on the air is produced by the vanes 96 (Figs. 1 and 4) which resemble those of a blower or supercharger. These vanes 96 also act to draw the air in the brake chamber through aperture 40 in deflector plate 35, and the combined currents of heated air then pass out through suitable openings 98 in the casing 3.

In the modified gear arrangement shown in Fig. 7 the driven wheel 26 is splined directly, as indicated at 101, to an extension 102 of the driven shaft, said extension having a reduced end portion 103 rotatably received with the assistance of a sleeve bearing 104 in the recessed end of the drive shaft 1. Also in this modification the drive is direct from the annular wheel 26 to the driven shaft 102, the load on which constitutes the sole means for resisting free rotation of said annular wheel with the driving pinions 12. Also in this modification the driving pinions 12 are shown as provided with radial extensions 106 which serve the same purpose as the weighted elements 54 shown in Fig. 2, namely, to exert a locking tendency as between the driving wheels 12 on the one hand, and the annular wheel 26 on the other, such tendency being of a value which increases with the square of the speed of the driving shaft and becomes sufficient at the critical speed to prevent any further rotation of the pinions about their individual shafts, and causes them to be locked with the driven wheel in a manner similar to that described above with reference to Figs. 1 to 6.

There is thus provided a novel driving mechanism which is effective to achieve the objects above enumerated and which is relatively inexpensive to manufacture, readily assembled or disassembled, and which possesses the further desirable quality that it can be adapted to a variety of uses and applications. Thus for example, although especially useful for driving a generator or other dynamo electric machine or accessory of the automotive vehicle, it may also be applied as a drive for any machinery where a constant speed is desirable and where the prime mover is subject to variations in speed.

While the embodiment of the invention herein illustrated possesses a high degree of merit from a practical as well as from other viewpoints, it is nevertheless contemplated that changes in construction and arrangement of parts will suggest themselves to persons skilled in the art in the light of the foregoing disclosure and it is to be understood that such means are within the scope of the invention herein disclosed and as defined in the broadest of the appended claims.

What is claimed is:

1. In a driving mechanism, a rotatable driving cage, a driven shaft, a plurality of driving wheels mounted on said cage, a driven wheel constantly engaged by each of said driving wheels and rotatable therewith, means including a friction device constantly opposing rotation of said driven wheel, means including an additional friction device for drivably connecting said driving wheels with said driven shaft, and means responsive to the speed of said driven shaft for varying the action of both said friction devices.

2. In a driving mechanism, a rotatable driving cage, a driven shaft, a plurality of driving wheels mounted on said cage, an annular wheel constantly engaged by each of said driving wheels and rotatable therewith, means including a friction device constantly opposing rotation of said annular wheel, means including an additional friction device for drivably connecting said driving wheels with said driven shaft, and centrifugal means common to both said friction devices for varying their action.

3. In a driving mechanism, a rotatable driving cage, a plurality of planetary wheels mounted on said cage, each of said wheels being rotatable about its own axis, an orbit wheel constantly engaged by said planetary wheels, means on each of said planetary wheels constantly tending to rotate said orbit wheel to the speed of said first named wheels, and friction means constantly opposing such rotation.

4. In a driving mechanism, a rotatable driving cage, a plurality of planetary wheels mounted on said cage, each of said wheels being rotatable about its own axis, an orbit wheel constantly engaged by said planetary wheels, a load to be driven, means on each of said planetary wheels constantly tending to rotate said orbit wheel to the speed of said first named wheels, means including a friction clutch drivably connecting said first-named wheels and load, and means responsive to acceleration of said load to cause said clutch to slip.

5. In a driving mechanism, a rotatable driving cage, a plurality of planetary wheels mounted on said cage, each of said wheels being rotatable about its own axis, an orbit wheel constantly engaged by said planetary wheels, a load to be driven, means on each of said planetary wheels constantly tending to rotate said orbit wheel to the speed of said first named wheels, a friction clutch drivably connecting said first named wheels and load, means responsive to acceleration of said load to cause said clutch to slip, and means for tightening said clutch after a predetermined reduction in speed.

6. In a driving mechanism, a rotatable driving cage, a plurality of dynamically unbalanced wheels mounted on said cage to revolve as a unit with said cage as well as being capable of rotation about their individual axes, an orbit wheel constantly engaged by said first named wheels, a load to be driven, a friction clutch drivably connecting said first named wheels and load, and means responsive to acceleration of said load to cause said clutch to slip.

7. In a driving mechanism, a rotatable driving cage, a plurality of dynamically unbalanced wheels mounted on said cage to revolve as a unit with said cage as well as being capable of rotation about their individual axes, an orbit wheel constantly engaged by said first named wheels, a load to be driven, a friction clutch drivably connecting said first named wheels and load, means responsive to acceleration of said load to cause said clutch to slip, and means for tightening said clutch after a predetermined reduction in speed.

8. In a driving mechanism, a rotatable driving cage, a plurality of dynamically unbalanced planetary wheels mounted on said cage, each of said wheels being rotatable about its own axis, an orbit wheel constantly engaged by said planetary wheels, a driven shaft coaxial with said orbit wheel, and means including a friction brake for controlling the driving ratio between said cage and shaft.

9. In a driving mechanism, a rotatable driving cage, a sun wheel coaxial therewith, a plurality of planetary wheels mounted on said cage, each of said wheels being rotatable about its own axis and constantly engaged by said sun wheel, a driven shaft coaxial with said sun wheel, a friction clutch connecting said wheel and shaft, resilient means encircling said shaft and laterally spaced from said friction clutch, and inertia means acted upon by said resilient means to exert an engaging pressure on said friction clutch.

10. In a driving mechanism, a rotatable driving cage, a sun wheel coaxial therewith, a plurality of planetary wheels mounted on said cage, each of said wheels being rotatable about its own axis, and constantly engaged by said sun wheel, a driven shaft coaxial with said sun wheel, a friction clutch connecting said wheel and shaft, means including a toroidal spring encircling said shaft and laterally spaced from said friction clutch, and means including a pivoted weight acted upon by said toroidal spring to exert an engaging pressure on said friction clutch.

CLINTON H. HAVILL.